United States Patent [19] [11] 4,121,684
Stephens et al. [45] Oct. 24, 1978

[54] TRUCK WITH TILTING CAB AND NON-TILTING SEPARATED SLEEPING COMPARTMENT

[75] Inventors: Donald L. Stephens, Los Gatos; Herbert H. Izuno, Fremont, both of Calif.

[73] Assignee: PACCAR Inc., Bellevue, Wash.

[21] Appl. No.: 769,794

[22] Filed: Feb. 17, 1977

[51] Int. Cl.² ............................................. B62D 33/06
[52] U.S. Cl. ............................ 180/89.14; 180/89.16; 296/28 C
[58] Field of Search .............. 180/89.14, 89.16, 89.18, 180/89.19; 296/23 MC, 28 C, 28 AL, 35 A; 49/383, 496

[56] References Cited

U.S. PATENT DOCUMENTS

| | | | |
|---|---|---|---|
| 1,666,328 | 4/1928 | Dennis | 49/496 |
| 2,724,877 | 11/1955 | Ramsay | 49/496 X |
| 2,740,487 | 4/1956 | Murty et al. | 180/89 |
| 2,914,121 | 11/1959 | Taylor | 49/383 X |
| 3,051,259 | 8/1962 | Lorenz | 180/89.14 |
| 3,297,355 | 1/1967 | Robinson | 296/23 MC |
| 3,508,783 | 4/1970 | Schlanger | 296/35 |
| 3,558,180 | 1/1971 | Algire | 296/23 |
| 3,719,244 | 3/1973 | Miller et al. | 296/22 MC X |
| 3,758,147 | 9/1973 | Burton | 296/23 MC X |
| 3,808,607 | 5/1974 | Harder | 296/33 MC X |
| 3,843,189 | 10/1974 | Duff et al. | 296/1 R |

Primary Examiner—Joseph F. Peters, Jr.
Assistant Examiner—Michael Mar
Attorney, Agent, or Firm—Owen, Wickersham & Erickson

[57] ABSTRACT

A motor truck tractor of the type having a tilting operator's cab hinged transversely to the front of the chassis for forward and upward tilting to provide access to the engine. A back wall of the cab is provided with an opening for a passageway, and unitary non-tilting sleeping compartment is secured to the chassis, with its front wall having an opening for the passageway. The two openings and the passageway are in longitudinal alignment when the cab is not tilted. The compartment is provided with sufficient interior vertical space to provide standing headroom in at least a portion thereof, and has enough interior horizontal space to provide area for a double sleeping cot. It may also include an office, with a desk. A gap-closing plate is mounted to the cab at the outer periphery of the back wall for closing a gap between the cab and the compartment. A seal between the cab in its untilted operating position and the compartment surrounds the periphery of the passageway for sealing together the interiors of the cab and the sleeping compartment without impairing later tilting of the cab.

21 Claims, 7 Drawing Figures

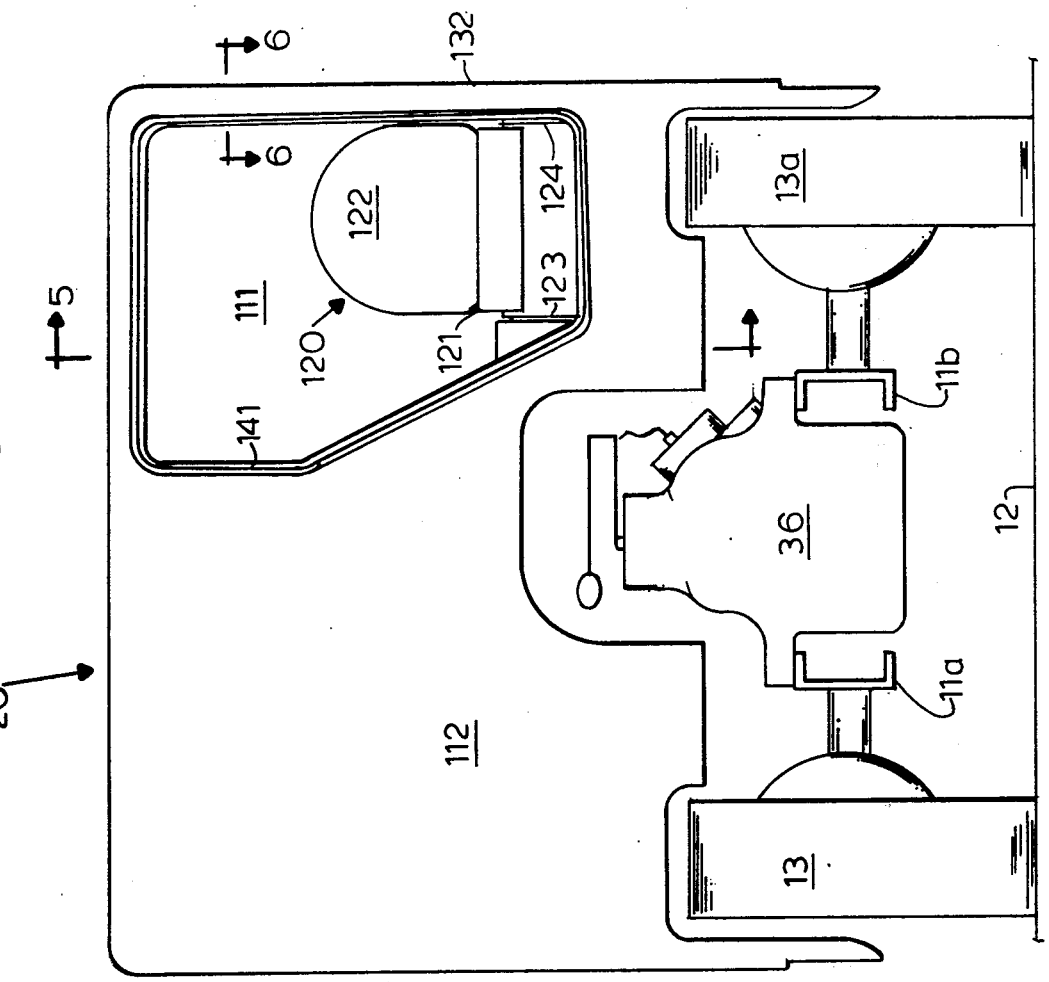
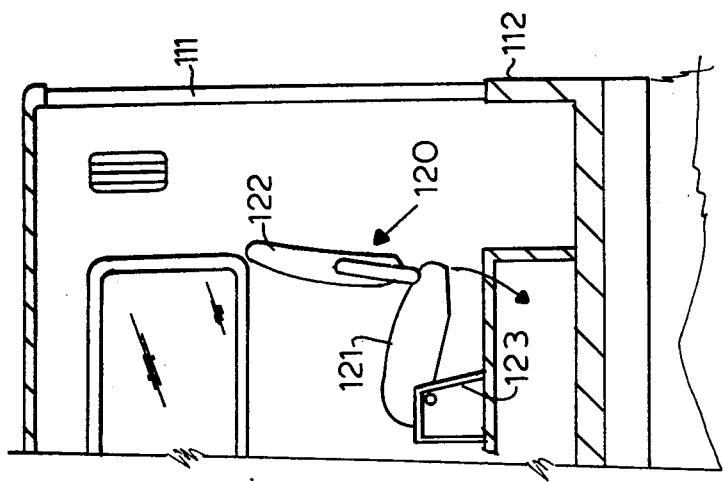

TRUCK WITH TILTING CAB AND NON-TILTING SEPARATED SLEEPING COMPARTMENT

BACKGROUND OF THE INVENTION

The present invention relates to a motor vehicle having a tiltable cab and a non-tilting sleeper compartment therebehind. More particularly, the present invention relates to an improved sleeper compartment for a motor truck tractor having a tiltable cab-over-engine.

Motor truck tractors having a tiltable cab mounted to the chassis over the engine have been in widespread use for a number of years. Such cabs have been typified by two basic types: cabs without sleeping compartments, and cabs having sleeping compartments providing a single bunk, and perhaps a small wardrobe closet for clothing.

In recent years long-haul transcontinental trucking operations have greatly expanded, and a need has arisen for truck tractors equipped with more comfortable sleeping and living accommodations than heretofore available.

One principal limitation to the expansion of the sleeping compartment portion of a cab pivotable over the engine has been the weight of the overall cab: the sleeper compartment had to be very small, even cramped so that it would not, by its excessive weight, impair the tiltability of the overall cab.

Thus, tilt-cab sleeper compartments have heretofore been uncomfortably cramped, with but a single, restricted area sleeping cot. There has been no physical separation from the cab, and engine and other operating noises including radio communications have made it difficult, if not impossible, for an occupant of the sleeping compartment to sleep comfortably. Also, tilt-cab sleeper compartments have been unusable for the intended purposes whenever the cab has been tilted for inspection or maintenance of the engine and other co-located components of the truck. The tilting of the sleeper compartment portion of the cab has heretofore precluded placement of small items of personal property, such as cosmetics, food, etc., in open portions of the sleeper, since they would be readily dislodged, broken or misplaced by the upward tilt.

Tilt-cab sleeper compartments of the prior art had no standing room, provided wholly inadequate access to natural lighting, have inadequate storage capacity, and afforded makeshift ventilation. Direct outside access to those compartments was usually unavailable, the only entrance and exit being accomplished by climbing awkwardly between the driving area and the sleeper compartment.

Recently, long-haul trucking has become increasingly a family activity, with spouses sharing the driving chores. Family occupancy of existing tilt-cab sleeper compartments has been inconvenient, uncomfortable and unacceptable to many truckers and their spouses, thereby adding loading expenses to the already substantial overhead including fuel costs of long-haul trucking operations.

While motor homes, travel trailers, and similar recreational vehicles have been developed to provide individuals and families with vehicularized living accommodations, those units have not been constructed with the requisite strength or durability to withstand the rigors of continuous commercial trucking operations. Yet the need for much improved living accommodations in long-haul commercial truck tractor units has not only remained unsolved heretofore, it has become significantly greater.

SOME OBJECTS OF THE INVENTION

With at least the foregoing limitations and drawbacks of the prior art in view, one object of the present invention is to provide, behind an over-the-engine tilting cab of a motor truck tractor, a non-tilting sleeping compartment which is secured to the truck chassis and which is separate from, yet accessible to, the cab when the cab is in its operational position.

Another object of the present invention is to provide a sleeping compartment which may be closed off from the cab of the truck.

A further object of the present invention is to provide a sleeping compartment for a truck which remains fully usable and undisturbed when the cab thereof is tilted forward for engine access.

A still further object of the present invention is to provide a weather and wind sealing joint between a tilting cab and a fixed sleeper compartment therebehind, for effectively sealing the cab to the sleeper compartment when the cab is in its untilted, operational position.

Yet another object of the present invention is to provide a separate sleeping compartment having direct outside access, standing headroom, a double-bed-sized bunk, a front window above the cab for viewing and improved day lighting, a full-length clothes wardrobe, an expanded storage compartment, and a fold-down cot above the bunk.

SUMMARY OF THE INVENTION

The objects are accomplished by a motor truck tractor having a chassis to which a tilting cab is mounted over an engine. Behind and in alignment with the cab, a unitary sleeping compartment is secured to the chassis. An opening in a rear wall of the cab is in registration with a door opening in the front wall of the sleeping compartment when the cab is in an untilted operating position, another opening helps provide an interior passageway. The compartment extends to a height above the cab to provide standing room to an occupant and to enable a front window in the front wall above the cab to admit daylight and to enable viewing in the truck's forward direction. A door in a side wall of the compartment enables direct access thereto from the outside. When the cab is in its untilted operating position, a gap-closing strip is exteriorly positioned about the periphery of the small gap between the cab and the compartment, and a sealing gasket is positioned, preferably, about the periphery of the interior passageway, so that weather and wind are precluded at the exterior juncture of the cab and the compartment and so that the interior of the cab and compartment are sealed at the passageway therebetween.

Preferably, the sleeping compartment has standing headroom from the floor, a double-bed-sized bunk, a collapsible single bunk above the double bunk, a full length clothes wardrobe, air conditioning, and a collapsible table or desk. There may also be an intercom between the cab and the sleeping compartment, as regulations may require.

Preferably, the tilting cab includes a collapsible rider's seat which may be collapsed into a stowed position to provide improved access through the passageway between the cab and the compartment.

Other objects, advantages, and features of the invention will become apparent from the following detailed description of a preferred embodiment presented in conjunction with the accompanying drawings.

BRIEF DESCRIPTION OF THE DRAWINGS

In the drawings:

FIG. 4 is a view in rear elevation taken along the lines 4—4 in FIG. 1.

FIG. 5 is a fragmentary view in side elevation and in section of the cab of FIG. 1 taken along the line 5—5 of FIG. 4.

FIG. 7 is a plan view in section of the sleeping compartment taken along the line 7—7 of FIG. 1.

DETAILED DESCRIPTION OF A PREFERRED EMBODIMENT

Figure 1:
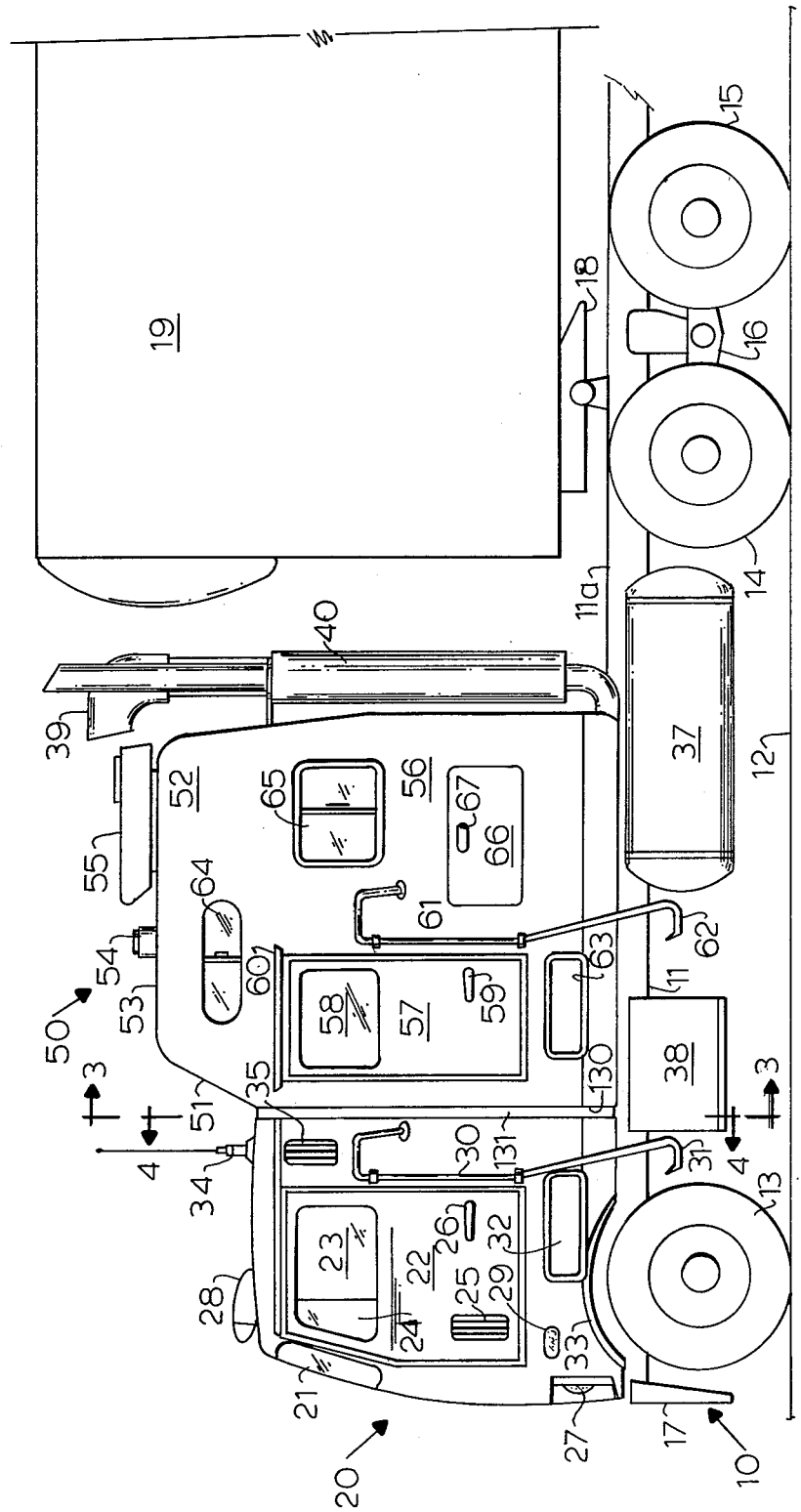
FIG. 1 is a view in side elevation of a truck tractor embodying the principles of the invention. A rear portion of a semitrailer mounted on the tractor is broken off to save space.

A cab-over-engine motor truck tractor 10 embodying the principles of the present invention is illustrated in the left side view in elevation of FIG. 1. The tractor 10 is essentially symmetrical in external appearance on both sides thereof, and the following description of structural elements viewable from the left side is intended to apply to corresponding, symmetrically located elements on the right side without specific description thereof included herein.

The tractor 10 may include a frame 11 (FIGS. 1 and 2) that includes longitudinally extending, oppositely facing, spaced-apart channel members 11a and 11b (FIG. 4) supported above the roadway 12 by front wheels 13 and 13a and by a double set of powered rear dual wheels 14 and 15 mounted to a suspension assembly 16 at the rear portion thereof. A front bumper 17 is mounted transversely across the front of the frame 11 in the conventional manner. A fifth wheel 18 mounted to the frame 11 above the rear wheel suspension assembly 16 enables a cargo-containing semitrailer 19 to be hitched to the tractor 10 for transportation thereof upon the roadway 12.

Pivotally hinged across the front of the frame 11 is a forwardly tiltable driver's cab 20 which is enclosed by four walls, a roof, and a floor in the well known manner. The cab 20 may include a windshield 21, an outwardly swinging hinged door 22 having a side window 23, a wing window 24, an air vent 25 and a door handle 26. The cab also includes headlights 27, running lights 28 on the roof of the cab and a side lamp and reflector 29 on the left side thereof. Rearwardly of the door 22 is a first climbing rail 30 supporting a step 31. A step well 32 is provided by a recess in the left side wall of the cab 20 below the door 22 and above a left wheel fender 33. A vertical communications antenna 34 may be mounted on a roof of the cab 20, and a second air vent 35 may be mounted in the left side wall of the cab 20 above the climbing rail 30. The tilting cab 20, shown in its tilted position in FIG. 2, may be any of several well known conventional designs for non-sleeping compartment tilting cabs in use at the present time, so long as it includes certain modifications discussed in connection with FIGS. 4 and 5 hereinafter. For example, a cab of the general type described herein is disclosed in U.S. Pat. No. 2,699,223 to Brumbaugh.

Also mounted to the frame 11 are an internal combustion engine 36 (FIGS. 2 and 4) located beneath the normal position of the cab 20, a fuel tank 37 (FIGS. 1 and 2), a battery box 38, an air intake pipe 39, and an exhaust pipe and muffler assembly 40.

Figure 3:
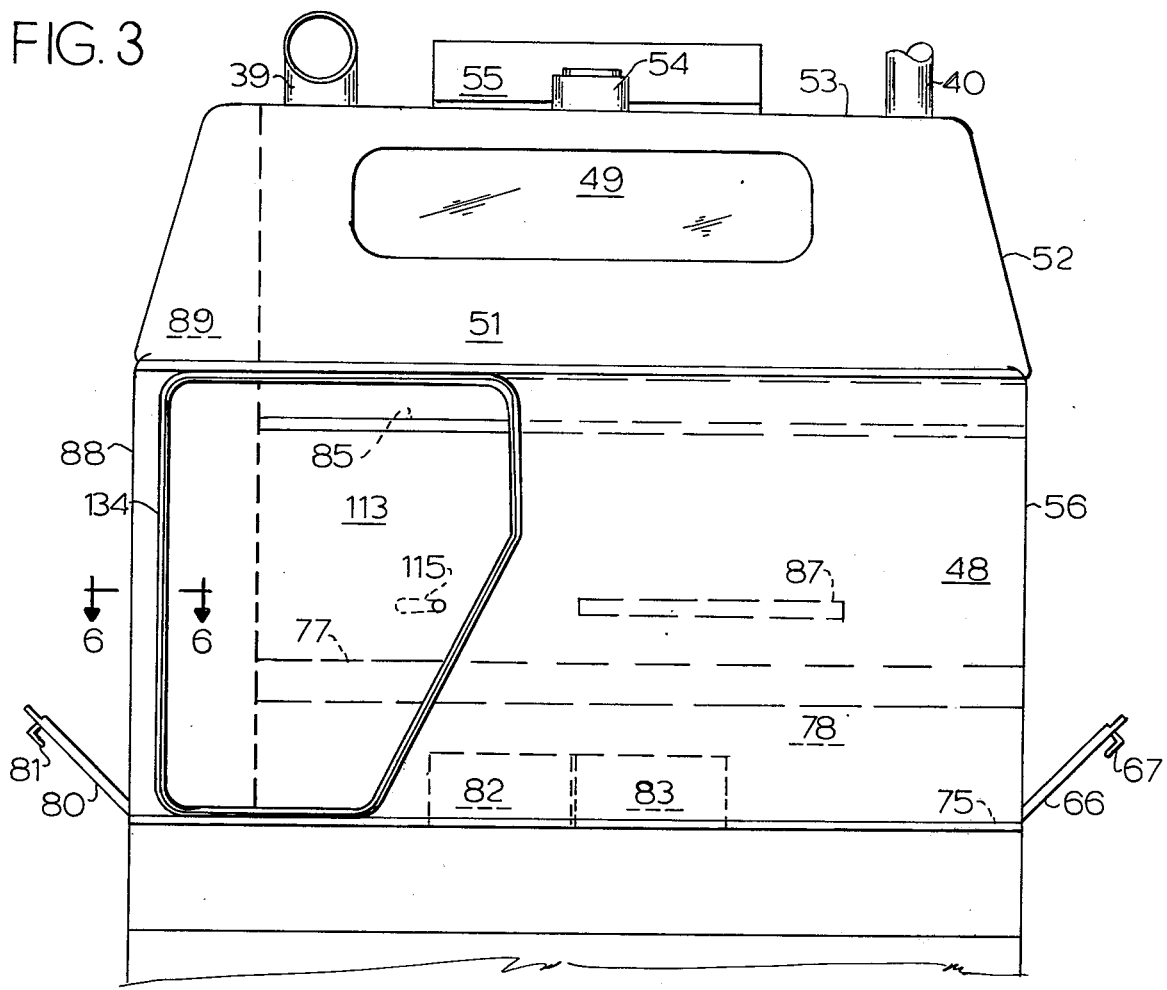
FIG. 3 is a view in front elevation and section taken along the line 3—3 in FIG. 1 showing the front wall of the sleeping compartment; some of the interior features thereof are shown in broken lines.

A sleeping compartment 50 which is a central feature of the present invention is shock-mounted securely to the frame 11 adjacently behind, and in transverse alignment with the cab 20 when the cab 20 is in its untilted operating position shown in FIG. 1. The sleeping compartment 50, like the cab 20, is enclosed by four walls, a roof and a floor. However, to provide comfortable standing room for most or all persons, the sleeping compartment 50 extends vertically to a height somewhat above the cab 20 as can be seen in FIG. 1. To reduce wind resistance, a portion 51 of a front wall 48 of the sleeping compartment 50 which is above the roof of the cab 20 preferably slants rearwardly to the roof 53. As shown in FIG. 3, side wall portions 52 of the compartment 50 extending above the cab 20 may also be slanted somewhat inwardly to the roof 53 to effect further reduction in wind resistance and to streamline the appearance of sleeping compartment 50. The slanted front wall portion 51 preferably includes a forward window 49 which admits sky light to the compartment 50 and enables an occupant to observe in the direction of forward movement of the tractor 10. The roof 53 of the compartment 50 preferably includes a two-way air vent 53 which passes ventilating air while excluding the harsher elements such as rain, etc., and the roof 53 may also support a heat exchanger 55 for an air conditioning system serving the cab 50 and the compartment 50.

Returning to FIG. 1, a left side wall 56 of the compartment 50 includes an outwardly hinged access door 57, preferably having a side window 58 and a door handle 59. A weather deflector 60 over the door 57 excludes rain and wash water from entering the interior of the compartment 50 above the door 57. A second climbing rail 61, substantially identical with the first climbing rail 31, is secured to the left wall 56 adjacently to and behind the door 57. The second rail 61 also has a step 62 at its lower end. A second step well 63 may be formed by a recess in the left side wall 56 of the compartment 50 below the door 57. Thus the step 62 and the step well 63 enable an occupant to reach the compartment from the roadway 12 by first grasping the rail 61 and then mounting successively the step 62 and the well 63 prior to passing through the open doorway, which is normally closed by the door 57.

Also present in the left side wall 56 of the sleeping compartment 50 are an upper, slidably openable ventilating window 64, a slidably openable sideview window 65, and a downwardly and outwardly hinged access door 66 leading to a storage compartment within the interior of the sleeping compartment 50. A locking handle 67 in the door 66 enables it to be opened and helps to secure it and lock it in a closed position.

Figure 2:
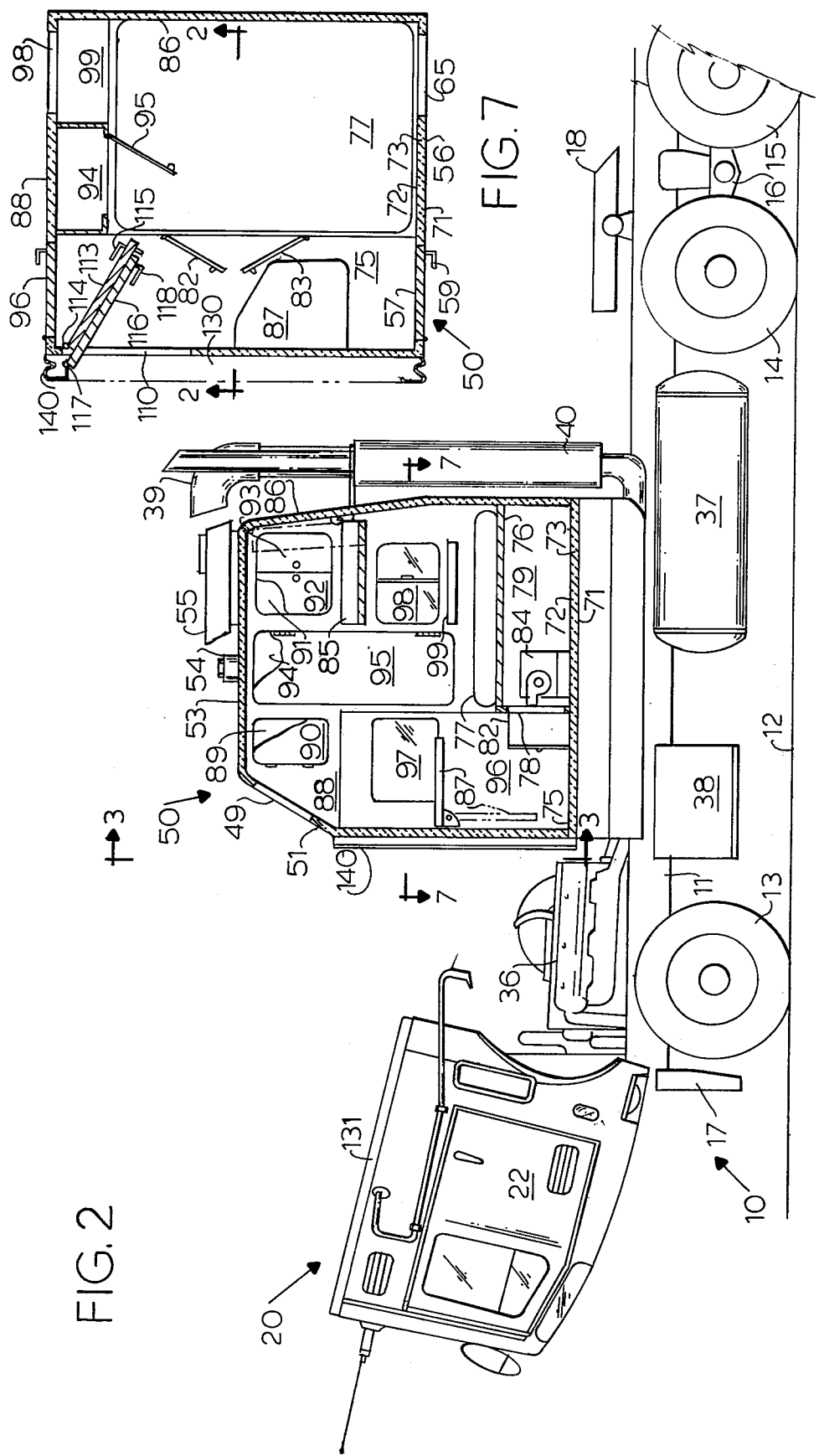
FIG. 2 is a view in side elevation of the tractor of FIG. 1 with the cab illustrated in its engine-access-enabling tilted forward position and with the sleeping compartment shown in vertical section to illustrate the interior thereof; interior closet doors have portions thereof broken away to show the compartments therebehind; and, the semitrailer has been omitted.

As shown by the section of the compartment 50, FIG. 2, the roof, floor, and walls thereof may be constructed of an outer skin 71 of sheet metal, an inner skin 72 of sheet material of metal or plastic, and insulation 73 therebetween. The insulating material 73 is preferably noncombustible, such as glass fibers. Structural ribs, not shown, provide the compartment 50 with its structural integrity and hold the outer skin 71 and the inner skin 72 in place.

The interior elements of the compartment 50 are best seen in the vertical section of FIG. 2 and also in FIGS. 3 and 7. The compartment has an insulated floor 75 at the front thereof. A raised platform 76 may support a double-bed mattress 77. A vertical wall 78 extends from the floor 75 to the platform 76 to provide a storage compartment 79 under the double bed, which is accessible via the exterior door 66 and also, if desired, via a right exterior door 80 having a locking handle 81 (FIG. 3). The compartment 79 is also accessible via double doors 82 and 83 (FIG. 3) mounted in openings in the vertical wall 78 (FIG. 2). An air conditioning unit 84 having both heating and cooling coils may be installed in the compartment 79 and provide air conditioning to the interior of the compartment 50. The unit 84 is connected to the heat exchanger 55 and to rotating machinery at the engine 36 in conventional fashion.

Also within the compartment 50 there may be a single bed 85 which is pivotally mounted to a rear wall 86 so that the bed 85 may be tilted upwardly to a stowed position against the wall 86 as shown by the dashed lines in FIG. 2. Hinged to the inside of the front wall 48 is a downwardly pivoting writing table or desk 87 (shown in its downward, stowage position by broken lines in FIG. 2). The writing table 87 is sized and positioned so that an occupant may sit upon the bed 77 and write comfortably upon the table 87.

As best seen in FIG. 2, inwardly adjacent a right side wall 88 of the compartment there may be a front upper storage compartment 89 accessed through an interior door 90 and a rear storage compartment 91 accessed via interior double doors 92 and 93. A vertical wardrobe closet 94 between the compartments 89 and 91 is provided with a vertically elongated closet door 95. Mounted in an access opening of the right side wall 88 below the front storage compartment is a right side access door 96 having a side view window 97 therein. Also mounted in the right side wall 88 is a slidably openable viewing window 98 below the rear storage compartment 91 and behind the vertical wardrobe closet 94. There may be a tray 99 below the window 98 (see FIG. 7).

Referring now to FIGS. 3 to 5 and 7, the front wall 48 of the sleeping compartment 50 is provided with an opening 110 therein which is sized and positioned to be in registration with a matching opening 111 in a rear wall 112 of the cab 20 when the cab is in its downward operating position. The openings 110 and 111 provide a walkway between the interior of the cab 20 and compartment 50.

A door 113 may be mounted, for example, on hinges 114 in the front wall 48 of the compartment to close off the walkway to the cab 20 if and when this is desired. A locking handle 115 on the door 113 enables opening, closing, and locking to secure the compartment 50, as for example when the truck must be left unattended with the cab 20 in its tilted-over engine-access enabling position. A door 116 may also be mounted on hinges 117 to the rear wall 112 of the cab 20. The door 116 may, as shown in FIG. 7, be arranged to swing in harmony with the door 113 when the cab 20 is in its untilted position. The door 116 may have a locking handle 118 enabling separate locking.

A rider's seat 120 is mounted in the cab 20, typically on the right side thereof. As shown in FIGS. 4 and 5, the seat 120 is collapsible to facilitate passage between the cab 20 and the compartment 50 via the openings 111 and 110. Preferably, the seat 120 has a bottom cushioned portion 122 pivotally mounted to the bottom portion 121 near the rear end thereof. The bottom portion 121 is pivotally mounted near the front thereof to two supporting brackets 123 and 124. A conventional locking mechanism (not shown) holds the seat 120 in a usable position, as shown in FIG. 5, yet is releasable so that the back 122 may be folded in a forward direction against the bottom portion 121 and so that the bottom portion 121 may then be rotated downwardly to a stowed position which removes the seat 120 as an obstacle blocking or impairing free passage through the openings 110 and 111.

As suggested by FIG. 1, a continuous gap 130 separates the back wall 112 of the cab 20 from the front wall 51 of the sleeping compartment 50. This gap 130 is provided to enable the cab 20 to be tilted forward to its engine-access position without interference or impairment by the adjacent non-tiltable sleeping compartment 50. The invention provides sealing means for closing this gap. The sealing means may take any of several forms, including an inflatable seal or a three-tiered seal.

Figure 6:
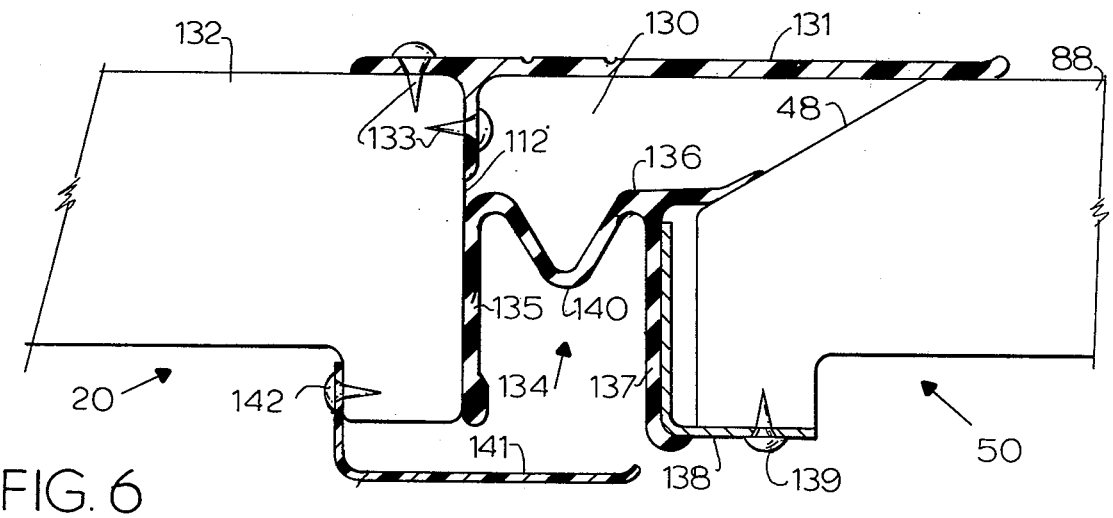
FIG. 6 is an enlarged view in section taken along the lines 6—6 in FIGS. 3 and 4 showing the gap seal between the cab and the sleeping compartment.

As one example of such sealing means, the outside periphery of this gap 130 may be closed by a trim member 131 which provides a wind seal between the cab 20 and the sleeping compartment 50 when the cab is in its operating position in front of the compartment. Such a trim member 131 not only streamlines the truck tractor 10, it improves the overall appearance of the tractor by unifying visually the untilted cab and the compartment. As shown in FIG. 6, the outer trim member 131 may be secured to a right side wall 132 of the cab 21 by screws 133. The outer trim member 131 extends longitudinally to the right side wall 88 of the sleeping compartment 50 to close exteriorly the gap 130 between the cab 20 and the compartment 50 for substantially the full distance thereof. The exterior trim member 131 is preferably fabricated of an extruded plastic material, such as polyvinychloride (PVC).

Another important feature of the sealing means of the present invention is the provision of an effective airtight seal between the untilted cab 20 and the sleeping compartment 50 at the periphery of the aligned openings 110 and 111. As shown in FIG. 3, a rubber gasket 134 surrounds the periphery of the opening 110 in the front wall 48 of the sleeping compartment 50. Referring now to FIG. 5, the gasket 134 has an outer lip portion 135 which contacts the back wall 112 of the cab around periphery of the opening 111 therein. The gasket 134 has a rearward projecting portion 136 which closely contacts the front wall 48 of the sleeping compartment 50. An inner segment 137, parallel with the outer portion 135, is bonded to one leg of an L-shaped metal bracket 138. The other leg of the bracket 138 is secured to the front wall 48 at the periphery of the opening 110 thereby by screws 139. An accordion portion 140 of the gasket 134, between the outer lip portion 135 and the inner segment 137, enables the gasket 134 to flex and thereby seal at the wall 112.

As shown in FIG. 4, a smoothly curved L-shaped inner trim member 141 is mounted just inside the periphery of the opening 111 in the back wall 112 of the cab 20. The inner trim member 131 is secured by screws 142 to the inside of the back wall 112 and closes the gap 130 between the openings 111 and 110 when the cab is untilted. The inner trim member 141 provides a shield in the passageway formed by the aligned openings 110 and 111 and protects occupants from being caught or pinched in the passageway by relative movements of the cab 20 and compartment 50 while the vehicle 10 is in operation.

The inner trim member 141 is preferably formed of a plastic material, such as copolymer of acrylonitrile, butadiene and styrene (ABS). The inner trim member 141 extends longitudinally to, but not past, the L-shaped bracket 138 so as not to be damaged during tilting of the cab 20.

To those skilled in the art to which this invention relates, many changes in construction and widely differing embodiments and applications of the invention will suggest themselves without departing from the spirit and scope of the invention. For example, the invention may be used on a full truck which has no trailer. The disclosures and the description herein are purely illustrative and are not intended to be in any sense limiting.

I claim:

1. A motor truck for hauling large payload trailers and having a truck tractor with a wheel supported chassis, an internal combustion engine mounted to said chassis at a front portion thereof and in driving connection with at least some of said supporting wheels, and a fifth wheel at the rear end of said chassis for connection to a said trailer, said tractor including in combination:

a tilting operator's cab normally over said engine in an operating position and hinged transversely to the front of said chassis for forward and upward tilting to provide access to said engine, said cab including a back wall defining an opening for a passageway, a unitary sleeping compartment secured fixedly and non-tiltably to said chassis forward of said fifth wheel, with a front wall defining an opening for said passageway, said sleeping compartment being in longitudinal alignment with said cab so that said opening in the front wall of said sleeping compartment is in substantial registration with said opening of said back wall when said cab is in its untilted operating position, said compartment having interior vertical space to provide at least partial standing headroom in a portion thereof, and having interior horizontal space to provide area for at least one sleeping cot, gap closing means mounted to said cab to the outer periphery of said back wall for closing a gap existing between said cab in said operating position and said compartment, and releasable sealing means between said cab in said operating position and said compartment about the periphery of said passageway for sealing together interiors of said cab and said compartment when said cab is in said operating position without impairing the tilting of said cab.

2. The motor truck set forth in claim 1 wherein said sealing means comprises a resilient gasket mounted between said cab and said compartment adjacently surrounding the periphery of said passageway and adapted to form a seal between said cab and said compartment when said cab is in said operating position which self releases upon upward tilting of said cab into its said engine access enabling position.

3. The motor truck set forth in claim 2 wherein said resilient gasket is engaged by the front wall of said sleeping compartment and the back wall of said cab, being secured to one of these walls and sealing against the other.

4. The motor truck set forth in claim 2 wherein said resilient gasket comprises a solid elastomeric member having a substantially flat outer portion providing a sealing surface, an undulating middle portion joined to said outer portion and a rigid anchoring inside portion joined to said undulating portion.

5. The motor truck of claim 1 further comprising shield means mounted adjacently inside the periphery of said passageway for shielding an occupant from being pinched between said cab and said compartment while passing through said passageway.

6. The motor truck of claim 3 further comprising a shielding plate mounted to said back wall of said cab adjacently inside the periphery of said opening therein and extending to the aligned opening in said compartment so as to close a gap between said cab and said compartment at said passageway and thereby protect an occupant therein from being caught or pinched therebetween.

7. A motor truck with a wheel supported chassis, an internal combustion engine mounted to said chassis at a front portion thereof and in driving connection with at least some of said supporting wheels, and a fifth wheel at a rear portion of said chassis for attachment of a large payload trailer to said truck, said truck including in combination:

a tilting operator's cab normally over said engine in an operating position and hinged transversely to the front of said chassis for forward and upward tilting to provide access to said engine, said cab including a back wall defining an opening for a passageway, a unitary sleeping compartment secured untiltably to said chassis forward of said fifth wheel and to the rear of said cab, with a front wall defining an opening for said passageway, said sleeping compartment being in longitudinal alignment with said cab so that said opening in the front wall of said sleeping compartment is in substantial registration with said opening of said back wall when said cab is in its untilted operating position, said compartment having interior vertical space to provide at least partial standing headroom in a portion thereof, and having interior horizontal space to provide area for at least one sleeping cot, and at least one sleeping cot mounted horizontally within said sleeping compartment above a floor therein.

8. The motor truck of claim 7 further comprising door means for closing said passageway between said cab in operating position and said compartment.

9. The motor truck of claim 8 wherein said door means comprises a door adapted to close said opening in locking engagement with said front wall.

10. The motor truck of claim 7 further comprising collapsible writing table means mounted in said compartment and placeable in a generally level writing position adjacent an edge of said sleeping cot so that said cot provides a seat to an occupant sitting at said table in said writing position.

11. The motor truck of claim 7 wherein said cot in combination with floor and wall structure of said compartment provides a storage locker under said cot and further comprising access openings enabling access to said storage locker.

12. The motor truck of claim 7 wherein a side wall of said compartment is provided with at least one direct access opening from the outside and further comprising a door for closing said direct access opening.

13. The motor truck set forth in claim 7 wherein said compartment extends vertically higher than said cab when said cab is in said untilted operating position, thereby exposing an upper portion of said front wall of said compartment.

14. The motor truck set forth in claim 13 having a sloping roof portion providing means for effectively deflecting air from a body such as a van or trailer immediately to the rear of said compartment and for thereby lowering aerodynamic resistance to forward motion.

15. The motor truck set forth in claim 13 comprising a window opening in the exposed upper portion of the front wall of said compartment, and transparent window pane means in said window opening for admitting light and enabling view into and from said compartment therethrough while blocking free passage therethrough.

16. The motor truck set forth in claim 7 comprising two-way vent means installed in a roof of said compartment for enabling free passage of ventilating air between the interior of said compartment and ambient environment while excluding rain, wash water, and the like.

17. The motor truck set forth in claim 7 comprising a wardrobe closet inside said compartment of sufficient vertical extension to enable clothing to be hung therein without substantially contacting a floor thereof.

18. The motor truck set forth in claim 7 comprising a plurality of sleeping cots therein.

19. The motor truck set forth in claim 17 wherein one of said cots is hinge-mounted above said double-occupant sleeping cot and pivotable to a stowed position out of the way when not in use as a cot.

20. The motor tractor set forth in claim 7 comprising a collapsible rider's seat in said cab and wherein said passageway is located adjacently behind said collapsible seat so that free movement through said passageway is enhanced when said seat is in a collapsed and stowed position.

21. A motor truck with a wheel supported chassis, an internal combustion engine mounted to said chassis at a front portion thereof and in driving connection with at least some of said supporting wheels, said truck including in combination:
- a tilting operator's cab normally over said engine in an operating position and hinged transversely to the front of said chassis for forward and upward tilting to provide access to said engine, said cab including a back wall defining an opening for a passageway,
- a unitary sleeping compartment secured to said chassis, with a front wall defining an opening for said passageway, said sleeping compartment being in longitudinal alignment with said cab so that said opening in the front wall of said sleeping compartment is in substantial registration with said opening of said back wall when said cab is in its untilted operating position,
- said compartment having interior vertical space to provide at least partial standing headroom in a portion thereof, and having interior horizontal space to provide area for at least one sleeping cot,
- at least one sleeping cot mounted horizontally within said sleeping compartment above a floor therein, and
- door means for closing said passageway between said cab in operating position and said compartment, said door means comprising two doors, one in the back wall of said cab and one on the front wall of said compartment, said doors being hinged to swing in harmony with each other when the cab is not tilted and each door being separately lockable.

* * * * *